United States Patent
Sengupta et al.

(10) Patent No.: US 11,280,739 B2
(45) Date of Patent: Mar. 22, 2022

(54) IRRADIATION OF PLASMONIC SURFACES PRIOR TO ANALYTE EXPOSURE

(71) Applicant: HEWLETT-PACKARD DEVELOPMENT COMPANY, L.P., Houston, TX (US)

(72) Inventors: Raghuvir N. Sengupta, Palo Alto, CA (US); Anita Rogacs, Palo Alto, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 825 days.

(21) Appl. No.: 16/077,334

(22) PCT Filed: Jul. 17, 2017

(86) PCT No.: PCT/US2017/042448
§ 371 (c)(1),
(2) Date: Aug. 10, 2018

(87) PCT Pub. No.: WO2019/017887
PCT Pub. Date: Jan. 24, 2019

(65) Prior Publication Data
US 2021/0208079 A1 Jul. 8, 2021

(51) Int. Cl.
*G01N 21/65* (2006.01)
*B82Y 15/00* (2011.01)

(52) U.S. Cl.
CPC ............ *G01N 21/658* (2013.01); *B82Y 15/00* (2013.01)

(58) Field of Classification Search
CPC .. G01N 21/648; G01N 21/658; G01N 21/554; G01J 3/4406; G01J 3/44; B82Y 15/00
See application file for complete search history.

(56) References Cited

U.S. PATENT DOCUMENTS

| | | | |
|---|---|---|---|
| 6,614,523 B1 | 9/2003 | Boss et al. | |
| 6,967,717 B1 | 11/2005 | Boss et al. | |
| 7,738,096 B2 | 6/2010 | Zhao et al. | |
| 7,812,938 B2 | 10/2010 | Guo et al. | |
| 8,582,099 B2 | 11/2013 | Guo et al. | |
| 2008/0250954 A1 | 10/2008 | Depta | |

(Continued)

FOREIGN PATENT DOCUMENTS

| | | |
|---|---|---|
| CN | 106153600 | 11/2016 |
| EP | 2636640 A1 | 9/2013 |

(Continued)

OTHER PUBLICATIONS

Stroyuk, Oleksandr L., et al. "Nanocrystalline TiO2/Au films: Photocatalytic deposition of gold nanocrystals and plasmonic enhancement of Raman scattering from titania." Materials Science in Semiconductor Processing 37 (2015): 3-8. (Year: 2015).*

(Continued)

*Primary Examiner* — Dominic J Bologna
(74) *Attorney, Agent, or Firm* — Tong Rea Bentley & Kim LLC

(57) ABSTRACT

A surface enhanced luminescence system may include a laser and a controller to output control signals causing the laser to irradiate the pre-analyte exposed plasmonic surface while maintaining a profile of the pre-analyte exposed plasmonic surface.

8 Claims, 2 Drawing Sheets

(56) References Cited

U.S. PATENT DOCUMENTS

| | | | |
|---|---|---|---|
| 2009/0162888 A1 | 6/2009 | Schmidt | |
| 2009/0207869 A1 | 8/2009 | Dantus | |
| 2009/0238723 A1* | 9/2009 | Guharay | G01N 27/622 422/68.1 |
| 2010/0171949 A1* | 7/2010 | Mazur | G01N 21/658 356/301 |
| 2015/0362486 A1* | 12/2015 | Li | G01N 21/648 506/9 |

FOREIGN PATENT DOCUMENTS

| | | |
|---|---|---|
| EP | 3004017 A1 | 4/2016 |
| WO | WO-2005114298 A2 | 12/2005 |

OTHER PUBLICATIONS

Kalkan, A. Kaan, and Stephen J. Fonash. "Laser-activated surface-enhanced Raman scattering substrates capable of single molecule detection." applied Physics letters 89.23 (2006): 233103. (Year: 2003).*

Kalkan, A. Kaan et al. "Laser Activated surface-enhanced Raman scattering substrates capable of single molecule detection," Applied Physics Letters, A, Publishing LLC, US, vol. 89, No. 23, Dec. 4, 2006.

Stroyuk, Oleksandr et al. "Nanocrystalline TIO2/Au films: Photocatalytic deposition of gold nanocrystals and plasmonic enhancement of Raman scattering from titania," Materials Science in Semiconductor Processing, vol. 37.

Liu, C., et al., "Preparation of Surface-enhanced Raman Scattering (SERS)-active Optical Fiber Sensory by Laser-induced Ag Deposition and Its Application in Bioidentification of Biotin/Avidin", Chem. Res. Chin. Univ., 2015, 31(1), pp. 25-30., doi: 10.1007/s40242-015-4294-0.

* cited by examiner

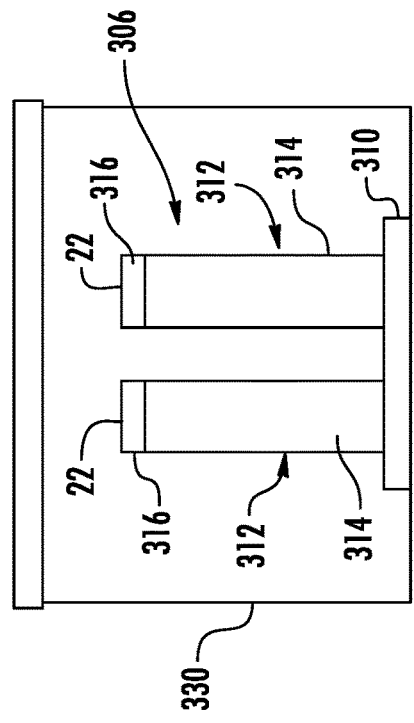
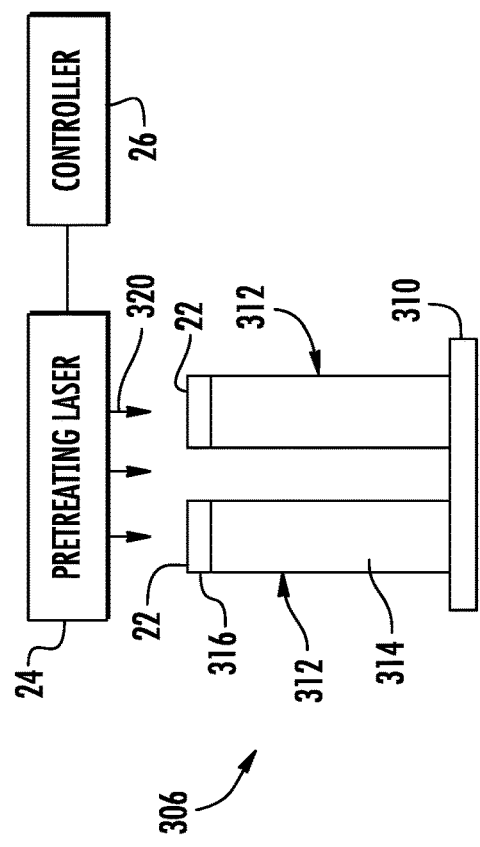
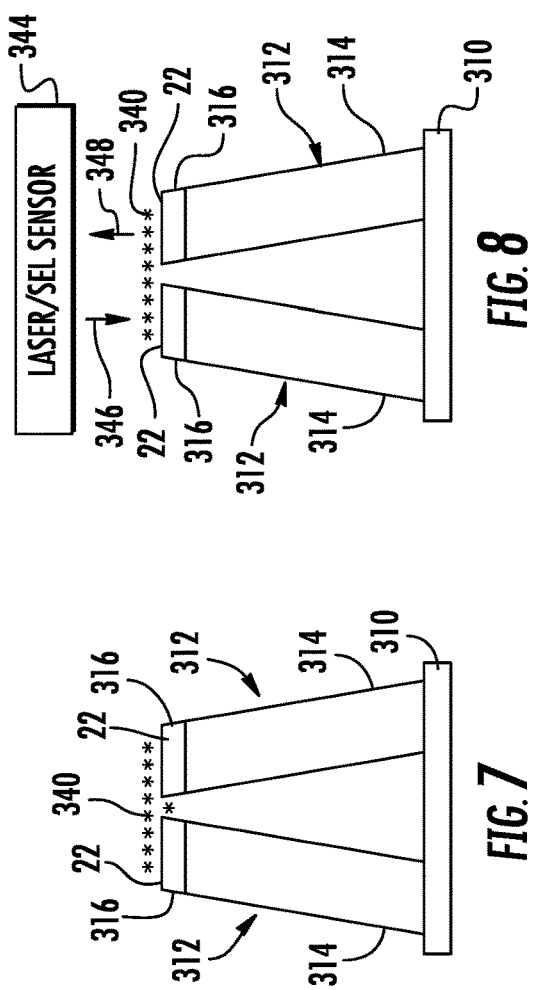
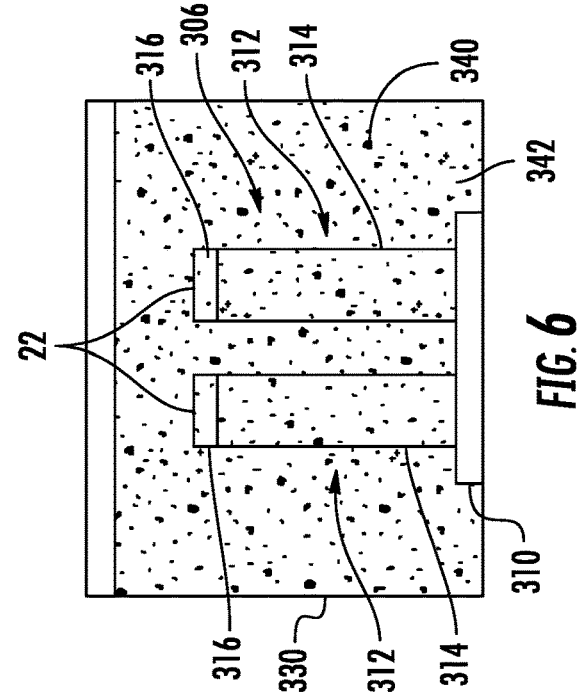

IRRADIATION OF PLASMONIC SURFACES PRIOR TO ANALYTE EXPOSURE

BACKGROUND

Surface enhanced luminescence is sometimes used for sensing and analyzing the structure of an analyte, such as inorganic materials and complex organic molecules. Surface enhanced luminescence testing may interrogate an analyte on or near a plasmonic surface by focusing electromagnetic radiation or light onto the plasmonic surface and onto the analyte and then sensing an optical response of the analyte.

BRIEF DESCRIPTION OF THE DRAWINGS

FIG. 4 is a schematic diagram illustrating an example plasmonic analyte interrogation stage undergoing pretreatment of plasmonically active surfaces.

FIG. 5 is a sectional view illustrating the example treated plasmonic analyte interrogation stage in an example packaging.

FIG. 6 is a sectional view illustrating the example treated plasmonic analyte interrogation state submersed in an analyte containing solution.

FIG. 7 is a side view illustrating removal of the analyte containing solution enclosure of the treated plasmonic surfaces.

FIG. 8 is a side illustrating interrogation of the analyte on the treated plasmonic surfaces.

Figure 1:
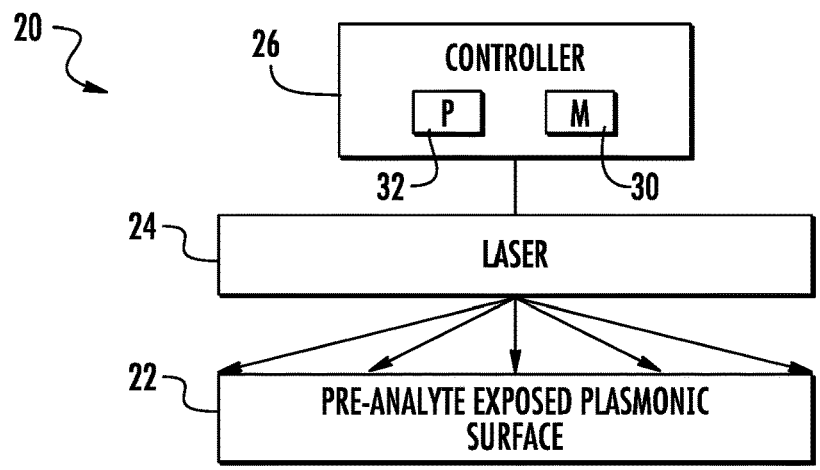
FIG. 1 is a schematic diagram of an example system for irradiating a plasmonic surface with light prior to analyte exposure.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION OF EXAMPLE

Disclosed herein are example systems, methods and surface enhanced luminescence (SEL) analyte interrogation stages or supports that further enhance an optical response of an analyte to interrogation by laser. The example systems, methods and SEL analyte supports achieve such further enhanced sensitivity through laser pre-treatment of a plasmonic surface that has not yet been exposed to analyte, hereinafter, a "pre-analyte exposed plasmonic surface". In contrast to laser ablation that alters and possibly deforms the plasmonic surface, such pretreatment does not substantially alter a profile of the pre-analyte exposed plasmonic surfaces. Examples of SEL interrogation applications comprise Raman spectroscopy, surface enhanced Raman spectroscopy (SERS), surface enhanced fluorescence and others spectroscopic techniques. When utilized in surface enhanced Raman spectroscopy, such systems, methods and analyte supports may provide enhanced sensitivity, producing spectra exhibiting peaks with amplitudes that are multipliers of the response from the same analyte on the same untreated plasmonic surface undergoing the same interrogation methods.

Disclosed herein is a surface enhanced luminescence system that may include pre-analyte exposed plasmonic surfaces, a laser and a controller to output control signals causing the laser to irradiate the pre-analyte exposed plasmonic surfaces while maintaining a profile of the pre-analyte exposed plasmonic surfaces.

Disclosed herein is an example method for preparing a plasmonic surface for surface enhanced luminescence. The method may include positioning a pre-analyte exposed plasmonic surface for irradiation by a laser and irradiating the pre-analyte exposed plasmonic surface with the laser while maintaining a profile of the pre-analyte exposed plasmonic surface.

Disclosed herein is an example surface enhanced luminescence analyte support that may comprise pretreated plasmonic surfaces, the pretreated plasmonic surfaces being pretreated with a laser that maintains a profile of the surface.

FIG. 1 schematically illustrates portions of an example SEL plasmonic surface preparation system 20 for preparing a pre-analyte exposed plasmonic surface 22 for subsequent exposure to an analyte being examined and for subsequent interrogation of the analyte. The pre-analyte exposed plasmonic surface 22 comprises a surface that has yet to be exposed to an analyte being examined. In one implementation, the pre-analyte exposed plasmonic surface 22 comprises a metal, such as gold or silver. In one implementation, the pre-analyte exposed plasmonic surface 22 may comprise a metal tip or cap on a bendable or flexible post, pillar or nano wire, wherein multiple posts may bend towards one another, positioning multiple metal tips or caps into close proximity so as to provide a "hot spot" there between during interrogation. In one implementation, the pre-analyte exposed plasmonic surface 22 may comprise other surfaces such as roughened metal surfaces, plates, particles or colloids.

System 20 pre-treats a pre-analyte exposed plasmonic surface 22 to enhance its optical sensitivity towards an analyte of interest. System 20 comprises laser 24 and controller 26. Laser 24 comprise a device that emits and directs light towards the pre-analyte exposed plasmonic surface 22. In one implementation, laser 24 may emit a selected wavelength of light from at least 488 nm to 1064 nm. In one implementation, laser 24 may emit a wavelength of light from 680 nm to 1064 nm for pretreating a gold pre-analyte exposed plasmonic surface 22. In one implementation, laser 24 may emit a wavelength of light from 488 nm to 532 nm for pretreating a silver pre-analyte exposed plasmonic surface 22. In some implementations, laser 24 may direct other wavelength of light to achieve certain levels of optical response from an analyte during interrogation on the treated plasmonic surface.

In one implementation, laser 24 may employ a raster feature, in which an applied laser is distributed over an area larger than the area of surface 22. As a result, all of surface 22 is exposed to laser 24. In one implementation, the applied laser light is distributed over an area of proximally 3 mm², wherein surface 22 is an area of approximately 0.8 mm².

Controller 26 comprises a device that controls the operation of laser 24. Controller 26 may control the duration at which laser 24 treats surface 22. In the example illustrated, controller 26 comprises a memory 30 and a processing unit 32. Memory 30 comprises a non-transitory computer-readable medium containing instructions for directing processing unit 32.

Processing unit 32 follows such instructions on memory 30. For purposes of this application, the term "processing unit" shall mean a presently developed or future developed computing hardware that executes sequences of instructions contained in a non-transitory memory, such as memory 30. Execution of the sequences of instructions causes the processing unit to perform steps such as generating control signals. The instructions may be loaded in a random access memory (RAM) for execution by the processing unit from a read only memory (ROM), a mass storage device, or some other persistent storage. In other embodiments, hard wired circuitry may be used in place of or in combination with software instructions to implement the functions described. For example, controller 26 may be embodied as part of one or more application-specific integrated circuits (ASICs). Unless otherwise specifically noted, the controller is not limited to any specific combination of hardware circuitry and software, nor to any particular source for the instructions executed by the processing unit.

In one implementation, instructions contained in memory 30 direct processing unit 32 to prompt a user to enter, through an input device such as a touchscreen display, keyboard or the like, a type or characteristic of the plasmonic surface to be treated. Based upon the input, processing unit 32, following instructions and memory 30, identifies a duration of treatment and power level for treating surface 22. In one implementation, instruction memory 30 may further direct processing unit 32 to prompt a user to enter a maximum duration permitted for the treatment of surface 22, wherein processing unit 32 may determine the power level of laser 24 based upon the input treatment duration. In one implementation where surface 22 comprises gold, controller 26 may direct laser 24 to apply light having a wavelength from 682 1064 nm. In one implementation where surface 22 comprises silver, controller 26 may direct laser 24 to apply light having wavelength from four and 88 nm to 532 nm. In one implementation, the power density of the light applied by laser 24 to surface 22 may be 5 kW per centimeter squared for a short duration, as short as 100 ms. In another implementation, the power density of the light applied by laser 24 to surface 22 may be as low as 1 kW per centimeter squared for durations as long as one minute or as long as up to three minutes or more. The level of power and duration of the treatment of surface 22 by laser 24 may vary depending upon the particular characteristics of plasmonic surface 22 acceptable levels of risk with regard to damage to surface 22 and available time for treatment.

In contrast to laser ablation that shapes, deforms or damages the plasmonic surface, such pretreatment by system 20 does not substantially alter a profile of the pre-analyte exposed plasmonic surfaces. When utilized in surface enhanced Raman spectroscopy, system 20 may provide enhanced sensitivity for surface 22, producing spectra exhibiting peaks with amplitudes that are multipliers of the response from the same analyte on the same untreated plasmonic surface undergoing the same interrogation methods.

Figure 2:
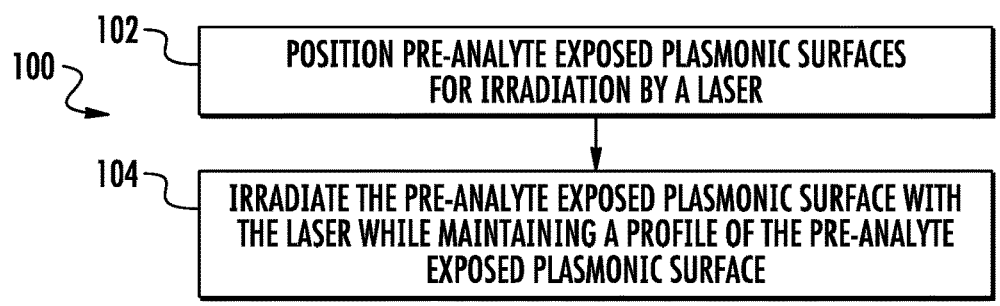
FIG. 2 is a flow diagram of an example method for irradiating a plasmonic surface with light prior to analyte exposure.

FIG. 2 is a flow diagram of an example method 100 for treating a pre-analyte exposed plasmonic surface. Method 100 irradiates a plasmonic surface with laser directed light, prior to exposure of the plasmonic surface to an analyte, to enhance the surface enhanced luminescence sensitivity during subsequent interrogation of an analyte applied to the plasmonic surface. Although method 100 is described in the context of being carried out by system 20, it should be appreciated that method 100 may be carried out with other similar systems.

As indicated by block 102, pre-analyte exposed plasmonic surface or surfaces 22 are positioned for irradiation by laser 24. As indicated by block 104, the pre-analyte exposed plasmonic surface 22 is irradiated by laser 24 while maintaining a profile of the pre-analyte exposed plasmonic surface 22. In other words, the irradiation of surface 22 is not to be confused with the shaping and forming of a roughened surface that that constitutes a plasmonic surface. In one implementation, the plasmonic surface comprises gold, wherein surface 22 is irradiated with light having a wavelength ranging from 682 to 1064 nm and nominally 785 nm. In one implementation, surface 22 comprises silver is irradiated with light having wavelength from 488 nm to 532 nm. In one implementation, surface 22 is irradiated by light at a power density of up to 5 kW per square centimeter for a short duration, short as 100 ms. In another implementation, surface 22 is a rated by light at a power density as low as 1 kW per square centimeter for a longer duration of one minute, three minutes or longer.

Figure 3:
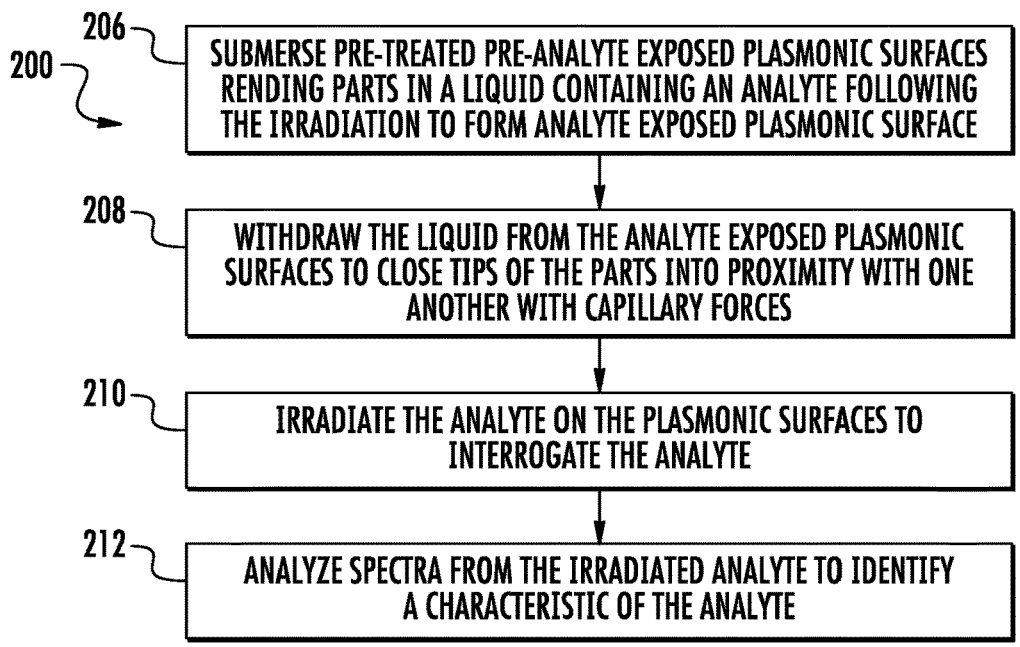
FIG. 3 is a flow diagram of an example method for interrogating an analyte on a plasmonic surface following the irradiation.

FIG. 3 is a flow diagram of an example method 200 for interrogating an analyte to identify characteristics of an analyte. As indicated by block 206, the pretreated pre-analyte exposed plasmonic surface or surfaces 22, such as surface 22 following the carrying out of method 100, are submersed in a liquid containing an analyte to form an analyte exposed plasmonic surface.

As indicated by block 208, the liquid is withdrawn from the analyte-exposed plasmonic surface so as to bend posts supporting the analyte exposed plasmonic surfaces and close the plasmonic surfaces on the tips of posts into close proximity to one another, creating "hotspots" for optical interrogation in block 210. In one implementation, the liquid is evaporated. In one implementation, heat is applied to assist in evaporating the liquid and closing or bending the posts towards one another.

As indicated by block 210, the analyte, adhered or bound to the plasmonic surface, is irradiated to interrogate the analyte. In one implementation, the same controller 26, using the same laser 24 applied to the plasmonic surface prior to analyte exposure, carries out the interrogation of the analyte by irradiating the analyte. In one implementation, the interrogation is carried out by controller 26 directing laser 24 to direct near-infrared light at the analyte and the analyte exposed plasmonic surface.

As indicated by block 212, the light emanating from the analyte is sensed and analyzed to identify a characteristic of the analyte. In one implementation, the spectra of the light emanating from the analyte is sensed and analyzed to identify a characteristic of the analyte. In another implementation, the fluorescence of the light emanating analyte is sensed and analyzed to identify a characteristic of the analyte. When utilized in surface enhanced Raman spectroscopy, the spectra may exhibit peaks with amplitudes that are multipliers of the response from the same analyte on the same untreated plasmonic surface undergoing the same interrogation methods.

FIGS. 4-8 illustrate one example of method 100 and 200 being carried out. FIG. 4 illustrates a pre-treating of a pre-analyte exposed plasmonic surface pursuant to method 100. FIG. 4 illustrates a plasmonic analyte interrogation stage 306 comprising a substrate 310 from which pillars 312 (also referred to as nano wires or nano fingers). Each of pillars 312 comprises a post 314 and a plasmonic cap 316 providing a plasmonically surface 22 to be pretreated. In one implementation, the plasmonic cap 316 may be formed from a metal such as gold or silver.

Each post 314 is dimensioned so as to be bendable such that had portions 316 of two adjacent pillars 312 may be brought into close, near contact with one another. In one implementation, each post 314 is formed from material and is dimensioned so as to be bendable in response to capillary forces to position had portions 316 of two consecutive pillars 312 within 3 nm of one another. In one implementation, each post 314 is formed from material and is dimensioned so as to be bendable in response to capillary forces to position had portions 316 of two consecutive pillars 312 within 1 nm of one another.

In one implementation, each of posts 314 has an aspect ratio of and at least 10:1 (a height of at least 10 times the thickness or diameter). In one implementation, such posts have a thickness or diameter between 50 nm and 100 nm, while, at the same time, having a height of at least 500 nm and, in one implementation, at least 700 nm. In some implementations, the posts 314 are movable and are self-actuating, wherein such columnar structures bend or flex towards one another in response to micro-capillary forces so as to self-organize, wherein such bending facilitates close spacing between the structures for greater scattered radiation intensity.

In one implementation, each post 314 comprises an elongated column formed from a polymer material. The polymer material facilitates the use of molding, imprinting or other fabrication techniques to form post 314. The polymer material further facilitates bending and flexing of post 314 and subsequently closing during use. Examples of polymer materials from which each post 314 may be formed include, but are not limited to, photo resist, PDMS, or a flexible material selected from the group, which includes both dielectric and non-dielectric materials, consisting of a highly cross-linked uv-curable or thermal-curable polymer, a highly cross-linked uv-curable or thermal-curable plastic, or a polysiloxane compound. In other implementations, post 314 may be formed from material such as silicon, silicon dioxide, spin-on glass, and a solgel material. In yet other implementations, each of posts 314 may be formed from other materials.

As described above with respect to method 100 and system 20, controller 26 directs pretreating laser 24 to irradiate pre-analyte exposed plasmonic surfaces 22 with light 320, The pre-analyte exposed plasmonic surface 22 is irradiated by laser 24 while maintaining a profile of the pre-analyte exposed plasmonic surface 22. In other words, the irradiation of surface 22 is not to be confused with the shaping and forming of a roughened surface that that constitutes a plasmonic surface. In one implementation, the plasmonic surface comprises gold, wherein surface 22 is irradiated with light having a wavelength from 682 1064 nm, nominally 785 nm. In one implementation, surface 22 comprises silver that is irradiated with light having wavelength from 488 nm to 532 nm. in one implementation, surface 22 is irradiated by light at a power density of at least 1 kW per square centimeter and no greater than 100 kW per square centimeter. In one implementation, surface 22 is irradiated by light at a power density of up to 5 kW per square centimeter for a short duration, short as 100 ms. In another implementation, surface 22 is irradiated by light at a power density as low as 1 kW per square centimeter for a longer duration of one minute, three minutes or longer, Once treated, plasmonic surfaces 22 on caps 316 are ready for exposure to an analyte to be interrogated.

In some circumstances, the exposure of the treated plasmonic surfaces 22 to an analyte and interrogation of the analyte following such pretreatment may be delayed. For example, in some implementations, such pretreating of surfaces 22 may be performed by a manufacturer or vendor of the plasmonic analyte interrogation stage 306, wherein the treated stage 306 may be stored for subsequent use or shipped to a customer or user. As shown by FIG. 5, in some circumstances, following pretreatment pursuant to method 100, stage 306 may be enclosed in a package 330. In one of limitation, package 330 provides a hermetic seal about stage 306. The hermetic seal may serve to inhibit re-contamination of surfaces 22 with airborne organic molecules which may have been released or deadsorbed from surface 22 during the pretreatment with laser 24. In other implementations, stage 306 may be exposed to an analyte and use for interrogation of the analyte shortly after pretreatment, such as within five minutes of such pretreatment. In other circumstances, exposure of surfaces 22 to analyte and subsequent interrogation may occur following longer delays from the time at which surfaces 22 are pretreated by laser 24.

FIGS. 6-8 illustrate one example of method 200 being carried out with the treated stage 306. As shown by FIG. 6, the pretreated plasmonically active surface 22 is exposed to an analyte 340. In the example illustrated, stage 306 is submersed in a solution are liquid containing analyte 340. During such time, the analyte 340 may be adsorbed by the plasmonically active surface 22.

As shown by FIG. 7, the liquid or solution 342, containing the analyte 340, is withdrawn. As a low result, capillary action bends the pillars 312 towards one another to move surfaces 22 of pillars and 12 into close proximity with one another. In one implementation, surfaces 22 of pillars during 12 are moved to within 3 nm, nominally within 1 nm of one another, binding an analyte 340 therebetween.

As shown by FIG. 8, a laser/SEL sensor 344 irradiates the closed pillars 312 with light 346. The sensor 344 further detects light 348 emanating from the analyte 340 on the closed pillars 312. For example, the sensor 344 may sense scattering of light or the fluorescence of the light emanating from analyte 340 in response to being impinged by light 346. The characteristics of the light 348 may be analyzed by controller 26 to identify characteristics of analyte 340. In one implementation, the laser employed by laser/SEL sensor 344 comprises the same laser 24 utilized to pretreat plasmonic surfaces 22.

In one example implementation, surfaces 22 of pillars 312 of stage 306 were pretreated with a near infrared laser with light having a wavelength of 785 nm at a power density of 35 mW per centimeter squared for three minutes. A raster feature on the laser 24 to ship it delays light over an area of approximate 3 mm$^2$, larger than the area of surface 22, 0.8 mm$^2$. All of the surface 22 was exposed to the laser. Thereafter, stage 306 was immersed in an aqueous solution of 1 μM melamine for 10 minutes. This was followed by rinsing pillars 312 with ethanol for approximately five seconds and allowing pillars 312 to air dry for approximately five minutes so as to close the gold plasmonic surfaces 22 on pillars 312. The stage 312 was subsequently measured for surface enhanced Raman spectroscopy on a Sierra Raman Spectrometer (power of 5 mW, integration time of one second) with a raster setting turned on. The spectra was analyzed and the amplitude of the melamine associated peak at 750 cm$^{-1}$ was compared to the amplitude resulting from the same procedure on the same stage 306 but in which surfaces 22 were not pretreated by laser 24. The amplitude of the melamine associated peaks on the treated plasmonic surfaces 22 was greater than the corresponding melamine associated peaks of the untreated plasmonic surfaces 22. In one implementation, the amplitude of such melamine associated peaks in the spectra from analyte on the treated plasmonic surfaces 22 was increased five times that of the melamine associated peaks in the spectra from analyte on the untreated plasmonic surfaces 22.

Although the present disclosure has been described with reference to example implementations, workers skilled in the art will recognize that changes may be made in form and detail without departing from the spirit and scope of the claimed subject matter. For example, although different example implementations may have been described as including one or more features providing one or more benefits, it is contemplated that the described features may be interchanged with one another or alternatively be combined with one another in the described example implementations or in other alternative implementations. Because the technology of the present disclosure is relatively complex, not all changes in the technology are foreseeable. The present disclosure described with reference to the example implementations and set forth in the following claims is manifestly intended to be as broad as possible. For example, unless specifically otherwise noted, the claims reciting a single particular element also encompass a plurality of such particular elements. The terms "first", "second", "third" and so on in the claims merely distinguish different elements and, unless otherwise stated, are not to be specifically associated with a particular order or particular numbering of elements in the disclosure.

What is claimed is:

1. A surface enhanced luminescence system comprising:
   an input device to receive a characteristic of a plasmonic surface to be treated;
   a laser; and
   a controller to:
      output a first control signal causing the laser to emit a power density of at least 1 kilowatt per square centimeter ($kW/cm^2$) and no greater than 100 $kW/cm^2$ at a wavelength that corresponds to the characteristic of the plasmonic surface, while maintaining a profile of a plurality of nanopillars on the plasmonic surface; and
      output a second control signal causing the laser to irradiate the plasmonic surface to produce a Raman signal.

2. The system of claim 1, wherein the second control signal is to interrogate an analyte that has been applied on the plasmonic surface.

3. The system of claim 1, wherein the second control signal causes the laser to irradiate the plasmonic surface at a wavelength of at least 488 nm and no greater than 1064 nm.

4. The system of claim 1, wherein the nanopillars have tips forming the plasmonic surface.

5. A surface enhanced luminescence method comprising:
   receiving a characteristic of a plasmonic surface to be treated;
   positioning the plasmonic surface for irradiation;
   irradiating the plasmonic surface with a first laser output at a power density of at least kilowatt per square centimeter ($kW/cm^2$) and no greater than 100 $kW/cm^2$ at a wavelength that corresponds to the characteristic of the plasmonic surface, while maintaining a profile of a plurality of nano pillars on the plasmonic surface; and
   irradiating the plasmonic surface with a second laser output to produce a Raman signal.

6. The method of claim 5, wherein the second laser output is to interrogate an analyte on the plasmonic surface.

7. The method of claim 5, further comprising:
   submersing the plasmonic surface in a liquid containing an analyte following the irradiating with the first laser to form an analyte exposed plasmonic surface;
   withdrawing the liquid from the analyte exposed plasmonic surface to close tips of the nano pillars into proximity with one another with capillary forces;
   irradiating the analyte on the plasmonic surface to interrogate the analyte; and
   analyzing spectra from the irradiated analyte to identify a characteristic of the analyte.

8. The method of claim 5, wherein the plasmonic surface is irradiated at a wavelength of at least 488 nm and no greater than 1064 nm.

* * * * *